United States Patent
Spring, Jr.

[19]

[11] Patent Number: 5,884,824
[45] Date of Patent: Mar. 23, 1999

[54] EQUIPMENT TRANSPORT RACK FOR VEHICLES PROVIDING IMPROVED LOADING ACCESSIBILITY

[76] Inventor: Joseph N. Spring, Jr., 246 Burroughs Rd., Boxboro, Mass. 01719

[21] Appl. No.: 685,439

[22] Filed: Jul. 23, 1996

[51] Int. Cl.$^6$ ............................. B60R 9/00; B60R 9/042
[52] U.S. Cl. ..................... 224/310; 224/309; 224/315; 224/319; 224/320; 224/321; 224/324; 224/325; 224/326
[58] Field of Search ................................. 224/309–331; 414/462

[56] References Cited

U.S. PATENT DOCUMENTS

| | | | |
|---|---|---|---|
| 3,460,694 | 8/1969 | Simms | 414/462 |
| 3,596,788 | 8/1971 | Willie | 414/462 |
| 4,728,244 | 3/1988 | Stokkendal | 224/319 |
| 4,930,671 | 6/1990 | Tittel | 224/329 |
| 5,417,358 | 5/1995 | Haselgrove | 224/310 |

*Primary Examiner*—David J. Walczak
*Assistant Examiner*—Timothy L. Maust
*Attorney, Agent, or Firm*—Kenneth L. Milik

[57] ABSTRACT

An equipment transport rack is mountable on the roof of a vehicle, and provides easy access for loading equipment thereon. The equipment payload is carried on a payload carrier mounted on a movable carriage assembly which has two operational positions. In the transport position, the payload is carried above the roof surface, thus avoiding interference with vehicle doors or windows and preventing safety hazards to passers by.

In the loading position, the carriage assembly extends outwardly and pivots downwardly from the roof area to project the payload carrier at least partially below the height of the roof edge and roof surface. In the loading position, the equipment payload may be easily and conveniently loaded and unloaded from the rack by a user of average height standing next to the vehicle. When the loading or unloading is completed, the carriage assembly pivots upwardly and slides inwardly to be returned to the transport position, where it is latched in position prior to vehicle movement. Various dedicated payload carriers may be interchangeably substituted on the carriage assembly or be integral with it. In a further embodiment, a single payload carrier accommodates multiple equipment types.

27 Claims, 12 Drawing Sheets

5,884,824

EQUIPMENT TRANSPORT RACK FOR VEHICLES PROVIDING IMPROVED LOADING ACCESSIBILITY

FIELD OF INVENTION

This invention relates generally to an equipment rack for mounting atop vehicles including sports utility vehicles or the like for carrying various equipment types including sports equipments during their transport and more particularly to an equipment rack providing features for improved user accessibility to facilitate loading or unloading the various equipments carried thereon.

BACKGROUND OF INVENTION

Sport utility vehicles have gained widespread popularity in recent years. Generally, these vehicles have a box-shaped cab section and include various features such as four wheel drive and heavy-duty suspensions which allow them to be used in most environments including the off-road environment. Vehicles of this type are therefore particularly well suited for transporting its occupants to remote and possibly difficult to reach outdoor locales for participation in outdoor sports. Examples of such outdoor sports include skiing and snowboarding, canoeing, bicycling, fishing, and camping.

Many of these sports require specialized equipment for their participation. Bicycling requires the bicycles, fishing requires the fishing poles, canoeing requires the canoe, skiing or snowboarding requires the skis, poles or the snowboard, and camping requires the tent. These specialized equipments must be carried along with the user to the remote outdoor locale, and because of the size and shape of the equipment, they most effectively are carried outside the vehicle on roof-mounted racks.

To some extent, the manufacturers of these vehicles have anticipated this need by providing many of these vehicles with generalized racks or load carriers. In basic form, the roof rack comprises a pair of spaced parallel rails or load bars, fixedly attached to the roof and aligned parallel to the centerline of the roof or transversely to it. The rails are elevated a slight distance from the roof surface, generally three to five inches. The ends of the rails have end brackets which attach to the roof by sheet metal screws or the like and hold the rails at the predetermined height. In a common configuration, the brackets for the two transverse rails are adjustably mounted in fixed linear tracks along each side edge of the roof, providing the user with the capability of setting the spacing between the two rails. Also, aftermarket versions of these generalized or multipurpose roof racks are provided that are installable and removable from the vehicle and may include end brackets that screwlock in the vehicle's roof gutters or clamp into the top of the side door openings.

As convenient as these generalized load carriers are, they do not include features for securely holding particular types of sports equipment. The user most often must purchase a dedicated roof rack, which includes features particularized for effectively accommodating one type of sports equipment. A rack for holding skis, for example, includes multiple slots which accept individual pairs of skis and/or pairs of ski poles, plus a securing bar which locks down the skis and poles so they will not be jarred lose by vibrations due to the vehicle motion. In addition, there may be a security lock feature to prevent the skis from being stolen when the vehicle is left unattended by its owner. As another example, a roof-mounted upright carrier for bicycles includes a wheel tray having a linear groove into which the bicycle tires are inserted, wheel straps for securely holding the wheels in the carrier during transport, and a holder to keep the bicycle frame in an upright position. Other dedicated equipment racks include similar specialized features and operations for the particular application.

The equipment is often loaded onto or unloaded off of the dedicated equipment rack a number of times consistent with the use of the equipment it carries. For example, a daylong ski trip will require that a ski rack be initially loaded at the user's home and unloaded at the ski area; at the conclusion of the skiing, the ski rack will be loaded at the ski area and then finally unloaded at the user's home. The repetitive loading and unloading of the dedicated equipment rack serves to multiply the problems inherent in its use.

Most vehicles in the sports utility category as described herein have a nominal height range from ground to roof of 65 inches to 75 inches. Some vehicles, such as the Ford Bronco, manufactured by Ford Motor Company of Detroit, Mich. have an advertised nominal roof height of 79.1 inches. As another example, the Chevrolet Suburban, manufactured by Chevrolet Motor Company of Detroit, Mich. has an advertised nominal roof height of 76.4 inches. From these examples, it is clear that the height of these vehicles and others within this category are for most users above the height of their shoulders or in many cases above the height of their heads. Furthermore, the roof width for vehicles of this type is generally within the range of 60 inches to 70 inches, making most of the roof area including the centerline or middle of the roof beyond the distance which the average user can reach, even when the user is elevated.

For a user to load or unload one of the dedicated equipment racks discussed here above it is often necessary for the user to reach over to access those portions of the rack near the centerline of the roof. In accomplishing this action, the most users must stretch and lean against the vehicle. Besides being physically difficult to accomplish, due to the height and width of the vehicle, the clothing of the user often will often become soiled with dirt, dust, or grease from the sides and roof of the vehicle. Also, apparel worn by the user may typically include metal buckles, zippers, or buttons which may scratch the vehicle's paint. Furthermore, the equipment items placed in the dedicated rack may likewise include metal or abrasive surfaces that may scratch or mar the paint and otherwise cause damage to the vehicle if not handled with appropriate control while being secured in the dedicated rack. This unwanted result is further aggravated by the number of times the rack must be loaded and unloaded as discussed here above.

Conventionally, there are two solutions to elevating the user's height with respect to the height of the roof to improve the user's access thereto. In the first method, the user opens a side door to the cab area and stands at the edge of the open doorway while holding onto the car body with one hand to maintain stability and using the remaining arm to access the dedicated rack. The user may also stand on running board, bumper, vehicle tire, or even tailgate, depending on the structure of the particular vehicle. The first method is inherently unstable and has the drawbacks of leaning against the vehicles discussed here above as well as the danger of injury to the user due to slipping or falling. In the second method, a step ladder or stool is utilized to elevate the user's height with respect to the roof. However, the step ladder or stool must be available at the point of unloading as well as the point of loading, and this necessitates that the step ladder or stool be carried in the vehicle to the remote location. This is a drawback because oftentimes the vehicles may be filled with cargo, for example, camping equipment or vacation luggage, so that little room remains inside the vehicle to utilize for the storage of a step ladder or stool. Also, step ladder and stools are generally dangerous unless placed carefully on solid, level surfaces. However, sport utility vehicles are often unloaded in remote outdoor locations, such as ski mountains, campgrounds, and lake fronts. At these typical locations the ground surface may be non-level and unstable, often being composed of snow, loose dirt, or sand. These uneven and unstable ground surfaces increase the possibility that a stool or step ladder could slip and the user could fall and be injured while trying to unload or reload the dedicated rack. All these problems are compounded when the equipment carried is large and bulky, as in the case of transporting a canoe or small boat.

One solution to this problem has been to provide dedicated racks which carry equipment at a level below the height of the roof. There are known carrying racks for bicycles and skis that attach to the bumper or spare tire mounting bracket at the rear of a vehicle. The drawback of devices of this type is that they interfere with the opening of the rear cargo door or rear window of the vehicle it is installed upon. Also, because these devices extend far outwardly from the vehicle, they present a safety hazard to vehicles, persons, or property in close proximity to the rack.

Another bicycle carrier is known which attaches to the trailer hitch at the rear of the vehicle, under the rear bumper. Upon activation of a release lever, the bicycle rack swings down and away from the rear of the vehicle for loading the rack or opening the rear cargo door of the vehicle. However, because this device extends far from the rear of the vehicle in loading position, it presents greater hazards to vehicles, persons, and property in close proximity thereto.

Another solution to this problem is disclosed in U.S. Pat. No. 5,390,837 to Ruffolo, entitled Snowboard Rack. In this patent, a rack for snowboards is disclosed which mounts to any roll-up window on an automotive vehicle by means of a suction cup, bracket, and support arm arrangement. Thus, the loading and unloading of the snowboard is accomplished at a convenient height. However, the snowboard rack has the same drawbacks of restricting access to window and door to which it is attached, and it also presents a safety hazard while it is attached to the vehicle because the rack projects a distance form the vehicle's side while the vehicle is in motion. There is a known ski transport rack for vehicles which clamps to the side window of a vehicle in a similar manner to provide convenient loading and unloading but also has the same drawbacks discussed above.

Although these difficulties in loading and unloading equipment racks are inherent for vehicle types known as sports utility vehicles, the same problems exist with vans and pickup trucks having caps or removable hardtops installed over their cargo decks. Furthermore, conventional equipment racks for automobiles have the same inherent problems, though lessened because automobiles generally have a lower ground to roof height and a smaller roof width. All these vehicle classes present the same difficulty for the user in reaching toward the centerline of the roof to access all portions of a dedicated equipment rack installed thereon.

Also, although the problems discussed here above have been particularized with regard to sporting equipment types carried by sports utility vehicles, the same problems exist in the non-recreational environment. Utility vans, trucks, minivans and related vehicles carry bulky work-related items such as ladders, tools, or building materials on the roofs of the vehicles for convenience. In this situation, the user must overcome the same problems encountered when loading and unloading dedicated or multipurpose equipment racks on sports utility vehicles.

From the forgoing discussion it is clear that a need exists for an equipment rack that may be installed on the roof of a vehicle to securely transport a variety of cargo or equipment while providing features which allow the rack to be easily and conveniently loaded or unloaded while overcoming the drawbacks of the prior art discussed here above.

SUMMARY OF INVENTION

It is therefore an object of the present invention to provide an equipment rack particularly useful for transporting equipment on or elevated over the roofs of vehicles, which has features to facilitate loading and unloading of the rack, without the drawbacks of prior art racks.

It is a further object of the present invention to provide an improved equipment transport rack for use with rental sports utility vehicles, which provides easy loading and unloading of the rack by the renting user.

The equipment transport rack of the present invention performs equally well with various sports equipment payloads including: skis and ski equipment; fishing poles; snowboards; surfboards and windsurfing boards; canoes; rafts; kayaks; small boats including sailboats with detachable sails; bicycles; waterskis;, wake boards; knee boards; hockey sticks; luggage racks, luggage carriers, recreation boxes; and camping-related cargo such as tents and supplies. In addition, non-sports related or utility cargo, such as ladders, lumber, plumbers pipe or tube may be effectively transported. It is also anticipated that, in addition to the known sports and non-sports related equipment as listed herein and their equivalent, new sports and non-sports related equipment will become known over time and will be advantageously carried by the equipment transport rack according to the present invention.

According to the present invention, an equipment transport rack is provided having two operational positions or modes: transport and loading. In the transport position or mode, the payload is carried above the roof height or above the roof surface within the boundaries of the roof edge, removably secured by a dedicated payload carrier, which has a structure specialized for holding single or multiple equipment types. The roof edge is the boundary separating the roof surface from the sides, rear, and front of the vehicle. Therefore, the equipment payload is safely stored at least above the roof height or advantageously over the roof surface during transport, where it is not projecting outwardly from the sides, rear, or front of the vehicle. In the transport mode or position, the equipment payload presents no interference with doors or windows and reduces or eliminates hazards to passerbys.

To facilitate loading or unloading of the equipment payload, the equipment transport rack includes a moveable section, or carriage assembly, which holds the equipment payload on in the payload carrier and extends outwardly and pivots downwardly from the roof area to project the payload carrier beyond the boundary of the roof edge and at least partially below the height of the roof edge and roof surface. This is the loading position. With the equipment transport rack in this position, the equipment payload may be easily and conveniently loaded and unloaded from the rack by a user standing next to the vehicle. The average user will not need to be elevated by a stepladder or stool, nor will it be necessary for the user to lean against the vehicle, or to stand in an open doorway of the vehicle, or to experience any of the other drawbacks of prior art devices. When the loading or unloading is completed, the carriage assembly portion of the rack is pushed upwardly and inwardly to be returned to the transport position, where it is latched in position prior to vehicle movement.

The equipment transport rack of the present invention includes a support foot means, which provides a fixed footing or mounting means for the rack. The carriage assembly includes the payload carrier and means for extending the rack outwardly, at least partially over the roof edge and downwardly, at least partially below the height of the roof edge. With respect to the equipment payload, the carriage assembly possesses two degrees of freedom, a linear component of motion in which the payload carrier slides outwardly and inwardly, and a rotational component in which the payload carrier rotates upwardly and downwardly, where each degree of freedom is possesses definite limits or ranges of motion.

To function as the fixed mounting for the equipment transport rack of the present invention, the support foot means permanently or removably mounts to the roof surface of the vehicle or on other support structures such as permanently mounted carrier rail tracks. To attach the support feet to carrier rail tracks, a conventional clamping means may be used. The support foot means includes at least one support foot. In the preferred embodiment a plurality of elongated support feet are provided, which are arranged and mounted on the roof in a spaced, parallel configuration, with one end close to the vehicle's roof edge. It is anticipated that for some applications the support foot means may effectively extend slightly beyond the roof edge. The support feet of the preferred embodiment each include means for pivotally attaching to the movable carriage assembly and means for latching the movable member in the transport position. In another embodiment within the scope of the present invention, a single support foot structure is provided, which includes a plurality of, spaced, parallel pivots or pivot mounting means. In another embodiment of the present invention, the plurality of support feet are basically small circular mounting brackets, each carrying a pivot or pivot mounting means. In the later two embodiments, the latching of the movable member in the transport position is provided by a latching means separate from the support foot means.

In the preferred embodiment, the movable carriage portion of the equipment transport rack of the present invention includes a plurality of extension slides, which are mounted for pivoting on the corresponding support foot means. Each extension slide includes a plurality of interlocking, overlapping slide sections or slide rails. As a minimum, there is a base slide rail, which is the lowest, innermost slide section, and there is a top slide rail, which is the highest, outermost slide section. The extension slides have a variable overall length controllable by sliding action of the slide rails. Therefore, each extension slide has a minimum or compressed length, as well as a maximum or extended length. In the preferred embodiment there are three slide rails: a base rail, an intermediate rail, and a top rail. The plurality of extension slides are oriented and aligned the corresponding support members so that, at the extended length of the extension slides, at least a portion of the top slide sections traverse the roof edge.

Each base slide rail is mounted for pivoting on its corresponding support foot. In the preferred embodiment, a pivot means includes pivot bracket which mounts on the underside of each base rail and attaches for rotation to the corresponding support foot by a pivot pin passes therethrough. In an alternative embodiment, the pivoting is accomplished by mounting an upper pivot bracket on the underside of each base rail and a lower pivot bracket on the upper side of the corresponding support foot with a pivot pin connecting the upper and lower pivot brackets and providing an axis of rotation about which the base slide rotates with respect to the support foot. In all embodiments, the pivot means is attached to each base slide and to each support foot means at the end nearest the roof edge.

The pivoting motion of the free end of each base slide is upwardly and outwardly toward the roof edge, and the range of pivoting motion is from a position approximately horizontal to the plane of the roof, in transport position, to an angle in the approximate range of 30 degrees to 90 degrees from the horizontal, in the loading position. The maximum possible angle depends on the range of the pivot means. Other limiting factors may be the mounting location of the support foot means and other factors such as the vehicle design. In the preferred embodiment, the pivot means includes a plurality of pivot stops, which are user selectable so that the user may choose the angle to which the rack tilts.

A payload receiver is mounted on the plurality of top slides. The payload receiver accepts a payload carrier which includes payload mounting means for releasably holding a specialized type of equipment. For example, a payload mounting means for skis and ski poles will include payload mounts in the form of clips, hooks and the like to hold the skis and ski poles in a securely during transport. In the preferred embodiment of the present invention, a dedicated payload carrier is mounted in the payload receiver on each of the top slides. Alternatively, it is within the scope of the present invention for the payload carrier to be integral with the equipment rack of the present invention so that the payload mounts would have a permanent attachment to the plurality of top slides. Also, in another embodiment of the present invention, various dedicated payload carriers may be interchangeably substituted on the top slides by the user, simply by removing and reinstalling mounting hardware. In yet another embodiment of the present invention, a payload carrier is provided transporting multiple equipment types. For example, a single a payload carrier may include payload mounts for skis and snowboards; another may include payload mounts for fishing poles, kayak, and paddles.

In the preferred embodiment, each support foot includes a latch means in the form of a latching block and locking cylinder to hold the corresponding extension slide of the carriage assembly in a stationary secure transport position when the vehicle is in motion. Once engaged, the latch means prevents rotational movement of the pivot means and the linear movement of the extension slides simultaneously, both functions being engaged from the near the roof edge.

A latching block includes a surface for supporting the corresponding extension slide horizontally in its compressed position and apertures for receiving latching projections which are integral with the corresponding top slide. With the latching projections of a top slide inserted into the apertures, the extension slide is prevented from pivoting. The latching block may be adjusted linearly along the length of the support foot and locked in position by a set screw. A single latching block may thus accommodate extension slides of differing compressed lengths.

When the extension slide is compressed with the latching projections inserted into the apertures of the corresponding latching block, a locking cylinder, mounted in the corresponding top slide, may be rotated to cause an attached lock pin to engage a slot in the pivot means to prevent linear movement of the extension slide.

In other embodiments, a single latching bar engages all of the plurality of extension slides simultaneously. In another embodiment, the latching means are separated from the support feet. In still another embodiment, a simplified latching function is provided by means of an elasticized bungee cord with hooks or snaplocks.

BRIEF DESCRIPTION OF THE DRAWINGS

The forgoing and other objects, features and advantages of the invention will be apparent from the following more particular description of a preferred embodiment of the invention, in conjunction with the accompanying drawings. In the drawings.

DESCRIPTION OF THE PREFERRED EMBODIMENT

Figure 1:
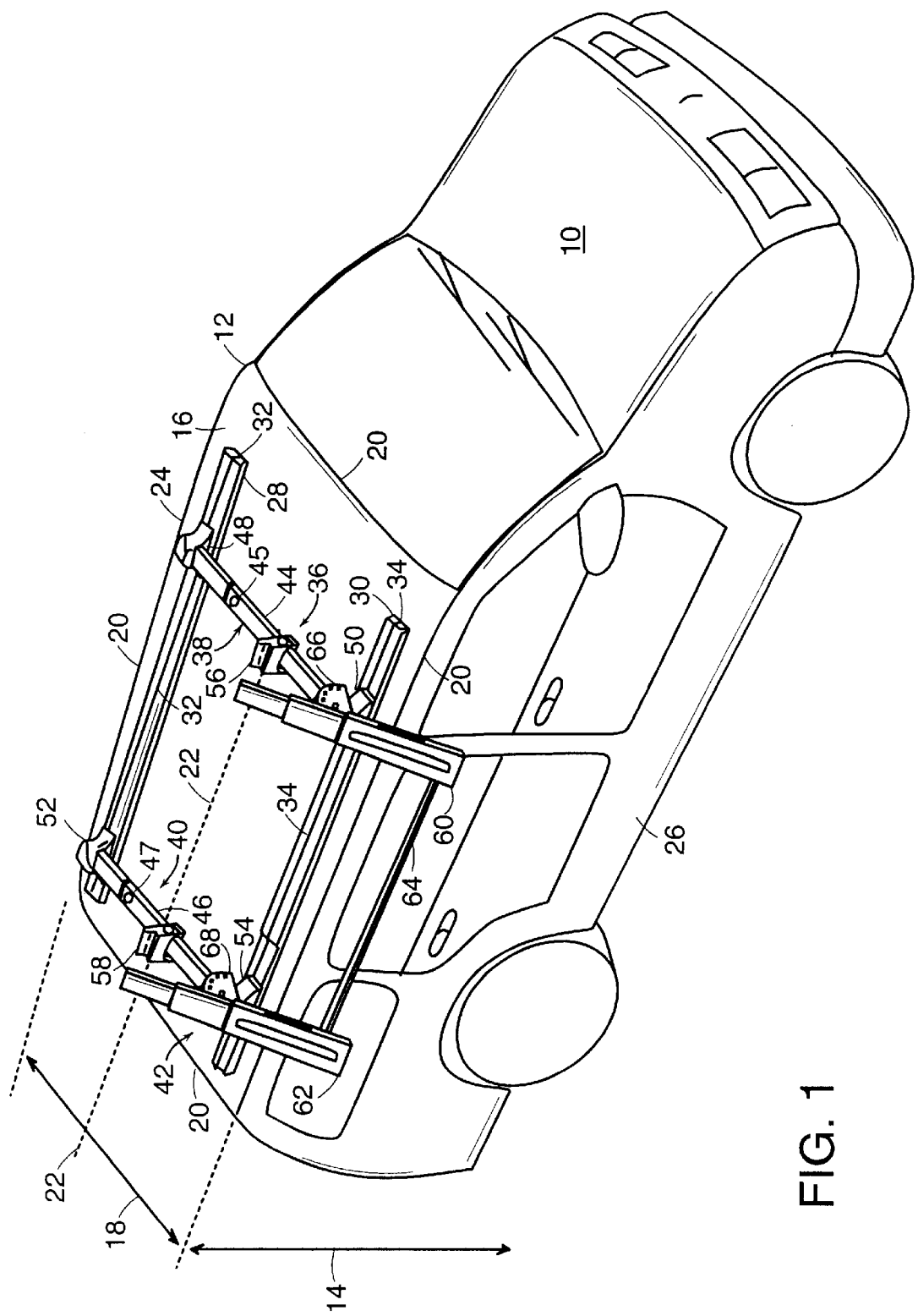
FIG. 1 is a perspective view of a vehicle showing the equipment transport rack according to the present invention mounted thereon, showing its major components.

Referring now to FIG. 1, a vehicle 10 is shown which uses an equipment transport rack in accordance with the present invention. The vehicle 10 has the configuration of a sports utility vehicle, which includes a large box-shaped cab 12. In this class of vehicles, cargo is stored internal to the vehicle and often externally on the roof surface 16. For vehicles of this type, the cabs have a ground-to-roof height 14 typically in the range of 65 to 75 inches. The height 14 contributes to a spacious internal cargo capacity for the vehicle, but the elevated roof surface 16 is above shoulder height for the majority of users. The height of the roof surface 16 limits the user's ability to reach onto the roof while the user is standing on the ground.

The size of the vehicle's cab 12 also defines the dimensions of the vehicle's roof surface 16. For vehicles of this type, roof width 18 is typically in the range of 60 to 70 inches.

The roof surface 16 is bounded by a roof edge 20 which extends around all four sides of the roof, establishing a boundary between the roof surface 16 and the vehicle's sides, back, and front. With most vehicles of the sports utility type, the roof edge 20 is clearly discernable. However, it should be noted that with certain streamlined vehicles, the roof surface 16 blends into the vehicle's sides, front, and back in gradual curves, making the roof edge 20 indistinct. With vehicles of this type, the roof edge 20 may be defined by a horizonal plane intersecting intermediate points in the gradual curve. In all vehicles, the roof edge 20 is even with or below the plane of the roof surface 16.

Also in FIG. 1, the roof surface 16 is shown to include a roof centerline 22, which bisects the roof surface 16 down its long axis. The roof centerline 22 may be defined as the line farthest from either of the vehicle sides 24 and 26. The centerline 22 is therefore that region of the vehicle which is least accessible to the user's reach. Thus, it can be generally concluded from a consideration of FIG. 1 that when equipment payload or cargo items are stored closer to the centerline 22 of the roof surface 16, the user would experience greater difficulty in reaching them. Conventionally, to access the roof surface 16 in vehicles of this type, a user must compensate for the extreme roof height 14 and roof width 18 by standing on some part of the vehicle or in the vehicle doorway, by utilizing a step ladder, and/or by leaning against the vehicle sides 24 and 26 to extend manual reach. However, this action may cause undesirable effects, including dirt on the user's clothing, scratching or marring of the vehicle's painted finish, and user injury from falling.

Permanently mounted on the roof surface 16 are roof carrier tracks 28 and 30. Conventionally, many vehicles are of this type of provided with a pair of parallel roof carrier tracks 28 and 30 during their manufacture as original equipment, mounted on the roof along the side edges. Also conventionally, the carrier tracks 28 and 30 include linear grooves 32 and 34 for receiving the end brackets of a pair of transverse mounted carrier rails. The carrier rails are designed to support a payload over the roof surface 16 between the carrier tracks 28 and 30. The spacing between the carrier rails are user adjustable by moving the end brackets along the track to a desired position and locking or clamping them in the desired position. In the preferred embodiment, the present invention mounts into existing tracks 28 or 30 on vehicles equipped therewith as will be described. Alternatively, other mounting methods and structures are contemplated for vehicles which do not include carrier tracks 28 and 30, or as an alternative to using tracks 28 and 30.

FIG. 1 shows an equipment transport rack 36 in accordance with the preferred embodiment of the present invention. The transport rack 36 includes a support foot means 38 and 40 and a movable carriage assembly 42 which carries the equipment payload.

The support foot means includes carrier rails 44 and 46 which terminate in end brackets 48, 50, 52, and 54 and which are adjustably mounted in carrier tracks 28 and 30. In the preferred embodiment, the carrier rails 44 and 46 have an adjustable telescoping length for accommodating the permanent spacing of the carrier tracks 28 and 30. The carrier rails 44 and 46 include set screw means 45 and 47 for locking their individual length at the desired setting. Alternatively the end brackets 48, 50, 52, and 54 may be fixedly attached to the roof surface 16 by sheet metal screws or bolts. The carrier rails 44 and 46 are elevated about three to five inches from the roof surface 16 by the end brackets 48, 50, 52, and 54. The support foot means also includes a latch means 56 and 58.

The carriage assembly 42 includes two parallel extension slides 60 and 62, which are joined by an adjustable spacer 64. The carriage assembly 42 is attached to the support foot means 38 and 40 by pivot means 66 and 68.

In FIG. 1, the equipment transport rack 36 is shown in its loading position, one of the its two operational positions. This will be described more particularly in conjunction with FIG. 3. Also, the extension slides 60 and 62 of the carriage assembly 42 are shown to be aligned with and in attachment to the support foot means 38 and 40, in particular with the carrier rails 44 and 46 and the pivot means 66 and 68. The carrier rails 44 and 46 are oriented in spaced, parallel configuration. In the preferred embodiment, the support foot means 38 and 40 provide a fixed mounting surface for the carriage assembly 42 of the present invention.

The support foot means 38 and 40 are adjustably mounted in tracks 28 and 30 by means of end brackets 48, 50, 52, and 54 and the positioning of the carrier rails 44 and 46 and the spacing between them may be chosen by the user. In a like manner, the spacing between the extension slides 60 and 62 of the carriage assembly 42 may be user selected by means of adjustable spacer 64 to match the spacing of the support foot means 38 and 40. Therefore, the overall configuration of the equipment transport rack 36, including its size and position on the vehicle roof surface 16, may be chosen by the user to accommodate the type of vehicle, the type of payload being carried thereon, or to satisfy other user specified preferences. Alternatively, the end brackets 48, 50, 52, and 54 may be fixedly attached to the roof surface 16 by sheet metal screws or bolts.

From FIG. 1 it can also be seen that the pivot means 66 and 68 are mounted in a fixed relation to the roof surface 16. Also, the pivot means 66 and 68 are orientated on the roof surface 16 in a spaced, parallel configuration, close or proximate to the vehicle's roof edge 20, relative to the roof width 22. Close or proximate to the roof edge 20 is not a precise location but a relative one. The precise required location of the pivot means 66 and 68 may depend on a particular vehicle's roof structure and its intended use. The advantages of the present invention may be realized with a wide variety of vehicles.

Figure 2:
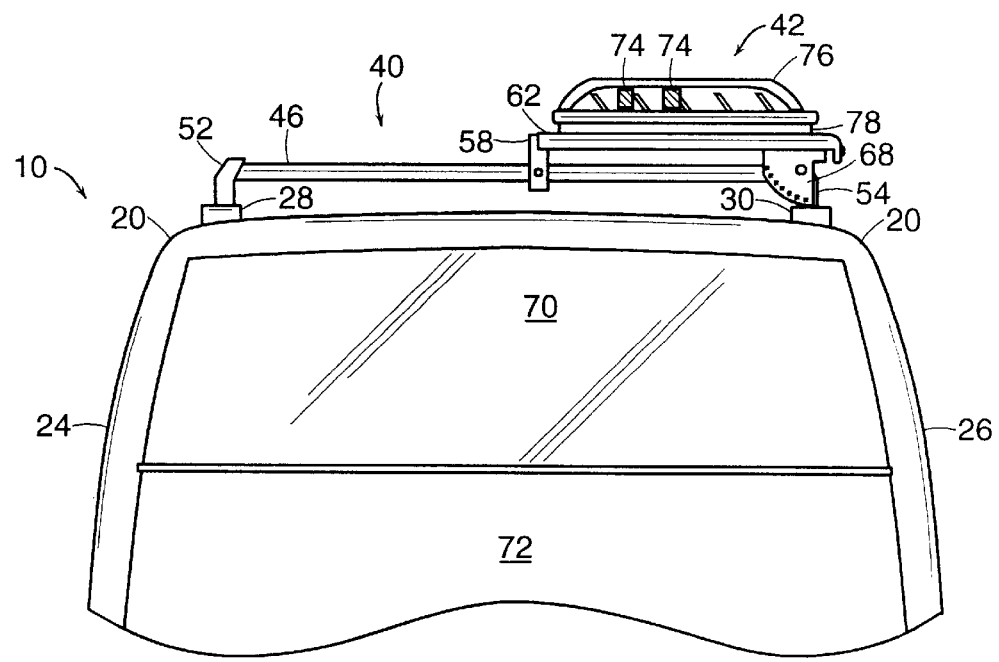
FIG. 2 is a partial rear view of the vehicle, showing the equipment transport rack in its fully-retracted transport position.
Figure 3:
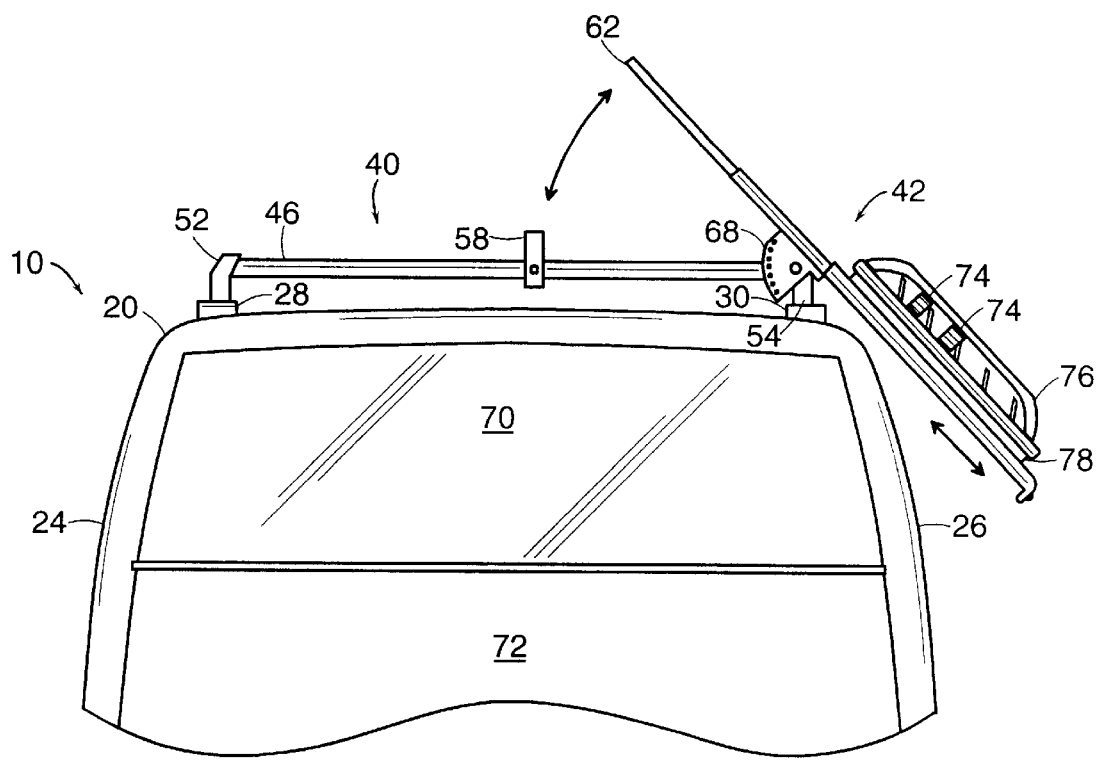
FIG. 3 is a partial rear view of the vehicle, showing the equipment transport rack in its fully-extended loading position.

Referring now to FIGS. 2 and 3, the structure of the present invention is more clearly shown. Both of these figures depict an upper portion of the vehicle 10, as viewed from the rear of the vehicle. Most sport utility vehicles include a large rear window 70 that is often part of a rear cargo door 72 or door section which opens outwardly or upwardly. Some vehicles of this type may include double opposingly mounted doors which open outwardly. The present invention is particularly useful with vehicles having rear doors of the types listed because access to the rear door 72 of the vehicle is never restricted when the equipment transport rack 36 is utilized. Conventional load carriers and racks which mount on the rear of the vehicle during transport may obstruct access to the rear door 72.

In FIGS. 2 and 3, the vehicle 10 is shown to have sides 24 and 26, a roof edge 20. From the rear view only a single support foot means 40 can been seen; however, this view advantageously shows the principle of operation of the equipment rack 36 of the present invention. The support foot means 40 includes the carrier rail end brackets 52 and 54 mounted in carrier tracks 28 and 30 which are permanently mounted on the roof surface 16. The support foot means 40 also includes the carrier rail 46 and the latch means 58. The major components of the carriage assembly 42 can also be seen in FIGS. 2 and 3, including the extension slide 62 and the pivot means 68.

According to the present invention, the equipment transport rack 36 has two operation positions: loading and transport.

The transport position is shown particularly with reference to FIG. 2. In this position the entire equipment rack 36 is on the top of the vehicle in a fully retracted and latched position.

The equipment payload 74 is carried above the roof surface 16 within the boundaries of the roof edge 20. Alternatively, it is contemplated that the equipment payload 74 may extend slightly beyond the roof edge 20. The equipment payload is removably secured by a dedicated payload carrier 76 which is attached to a payload receiver 78. The payload carrier 76 has a structure for holding single or multiple equipment types. For example, a single payload carrier 76 could be used for holding downhill skis as well as cross country skis, which are generally narrower, along with fishing poles or other equipment having diverse uses.

The roof edge 20 is the boundary separating the roof surface 16 from the sides, rear, and front of the vehicle. In the transport position, the equipment payload is safely stored over the roof during transport, and generally not projecting outwardly from the sides, rear, or front of the vehicle, or is projecting only a minimal distance and therefore presents no safety hazards.

To facilitate loading or unloading of the equipment payload, the carriage assembly 42 extends outwardly and pivots downwardly from the roof area to bring the payload carrier 76 to a position at least partially beyond the roof edge 19 and at least partially below the height of the roof surface 16. This is the loading position, shown particularly in FIGS. 1 and 3. From consideration of these figures, the main advantage of the present invention can be readily grasped. In the loading position, the payload carrier 76 has been relocated below the level of the roof surface 16 and is therefore accessible for loading and unloading equipment from the rack at a height which is convenient to the user. During loading the user will be standing squarely in the ground surface and there will be no risk of injury due to falling off a step ladder or stool as would be required in the prior art. Also, the payload carrier is shown to be extended outwardly from the side of the vehicle, beyond the roof boundary defined by the roof edge 16. Therefore, there is no need for the user to lean against the vehicle side. Equipment may be loaded on the payload carrier 76 in a controlled manner so that the equipment items will not come into contact with the side or roof of the vehicle to mar or scratch or otherwise damage the vehicle. The average user will not need to be elevated by a step ladder or stool, nor will it be necessary for the user to lean against the vehicle, or to stand in the open door of the vehicle, or to experience any of the other drawbacks of prior art devices. When the loading or unloading is completed, the movable carriage assembly 42 of the rack is pushed and slid upwardly returning it to the transport position. The equipment transport rack is latched in the transport position when the vehicle is in motion.

Figure 4:
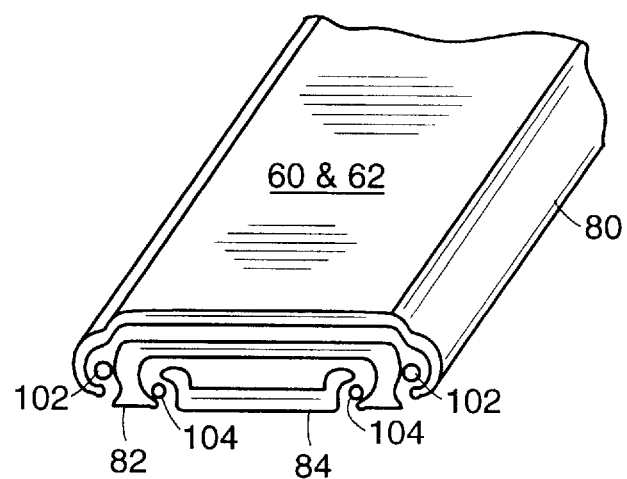
FIG. 4 is a partial perspective view of an extension slide as used in the present invention, showing three interlocking, overlapping slide rails.

Referring to FIG. 4, the extension slide 62 is a telescoping member that includes a top slide rail 80, an intermediate slide rail 82, and a base slide rail 84. The payload carrier 76 is mounted on the top slide rail 80 of each extension slide. The extension slides 60 and 62 in the preferred embodiment have a variable overall length so that the payload carrier 76 carrier may be extended consistent with the length of the extension slide from the inside to the outside of the boundary of the roof surface 16 as defined by the roof edge 20.

In FIG. 3, the payload carrier 76 is shown to have pivoted downwardly with respect to the roof edge 19. A pivot means 68 joins the base slide rail 84 to the support foot 40 in a manner to permit the base slide rail 84 to pivot upwardly and outwardly toward the roof edge, and the range of pivoting motion is from a position approximately horizontal to the plane of the roof in transport position to an angle in the approximate range of 30 degrees to 90 degrees in the loading position. Both components of motion for the carriage assembly 42 is depicted in FIG. 3 by arrows.

The structure of the carriage assembly 42 is shown in more detail with reference to FIGS. 4 through 7. The carriage assembly 42 includes a plurality of extension slides 60 and 62 arranged in a parallel configuration. The plurality of extension slides 60 and 62 are oriented and aligned with the corresponding support foot means so that, at the extended length of the extension slides, at least a portion of the top slide sections traverse the roof edge.

Figure 5:
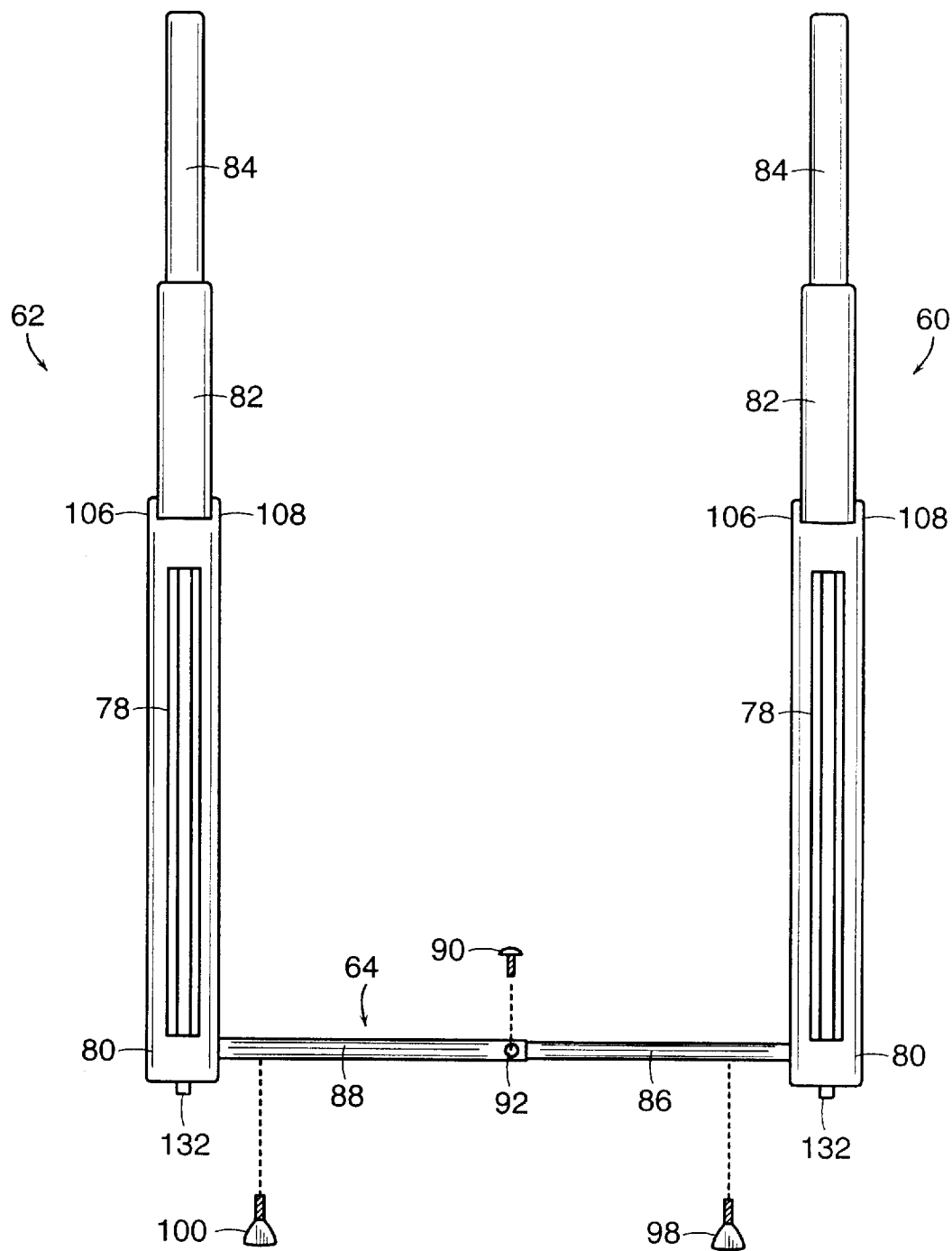
FIG. 5 is a top plan view of the carriage assembly of the present invention.
Figure 6:
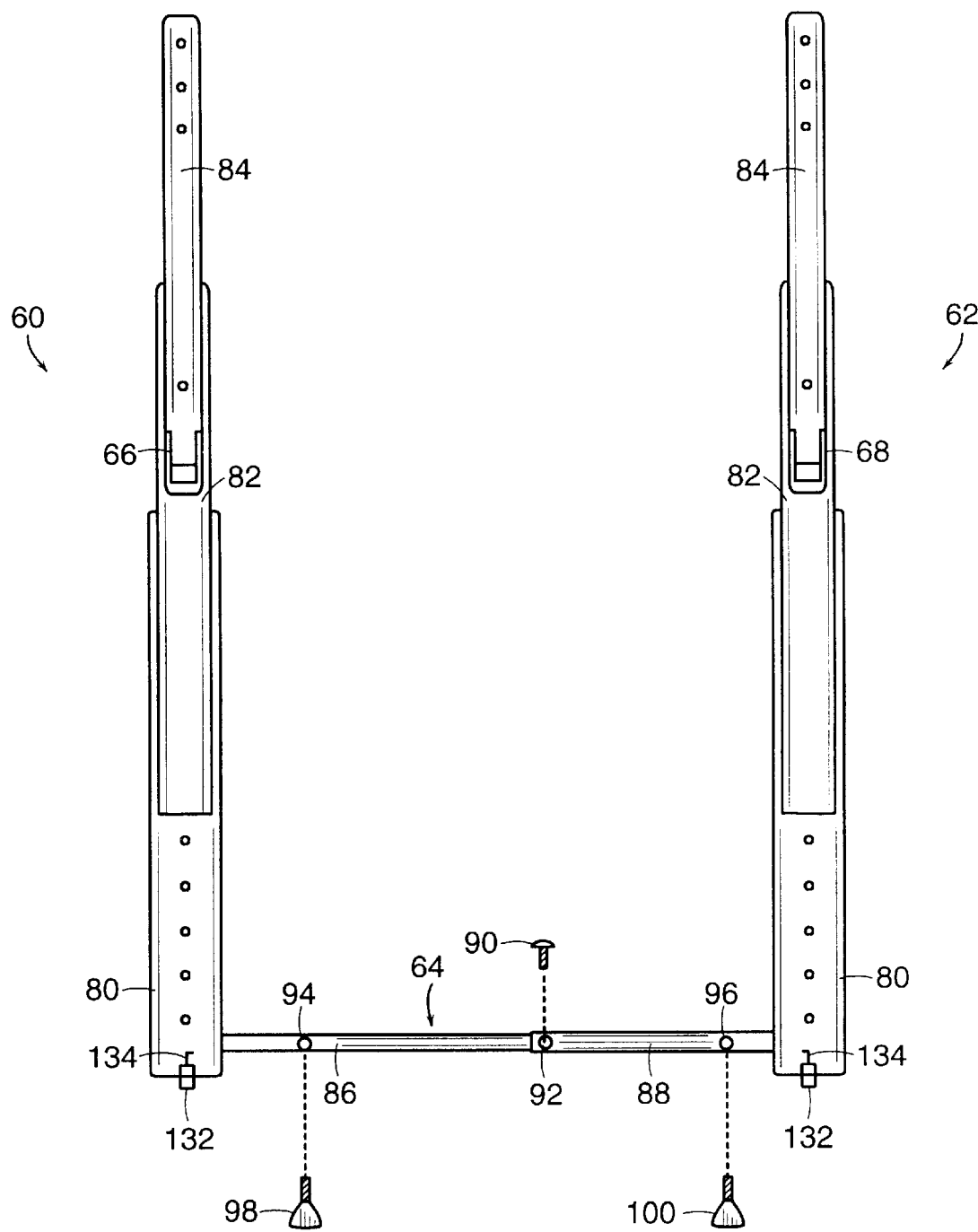
FIG. 6 is a bottom plan view of the carriage assembly of the present invention.
Figure 7:
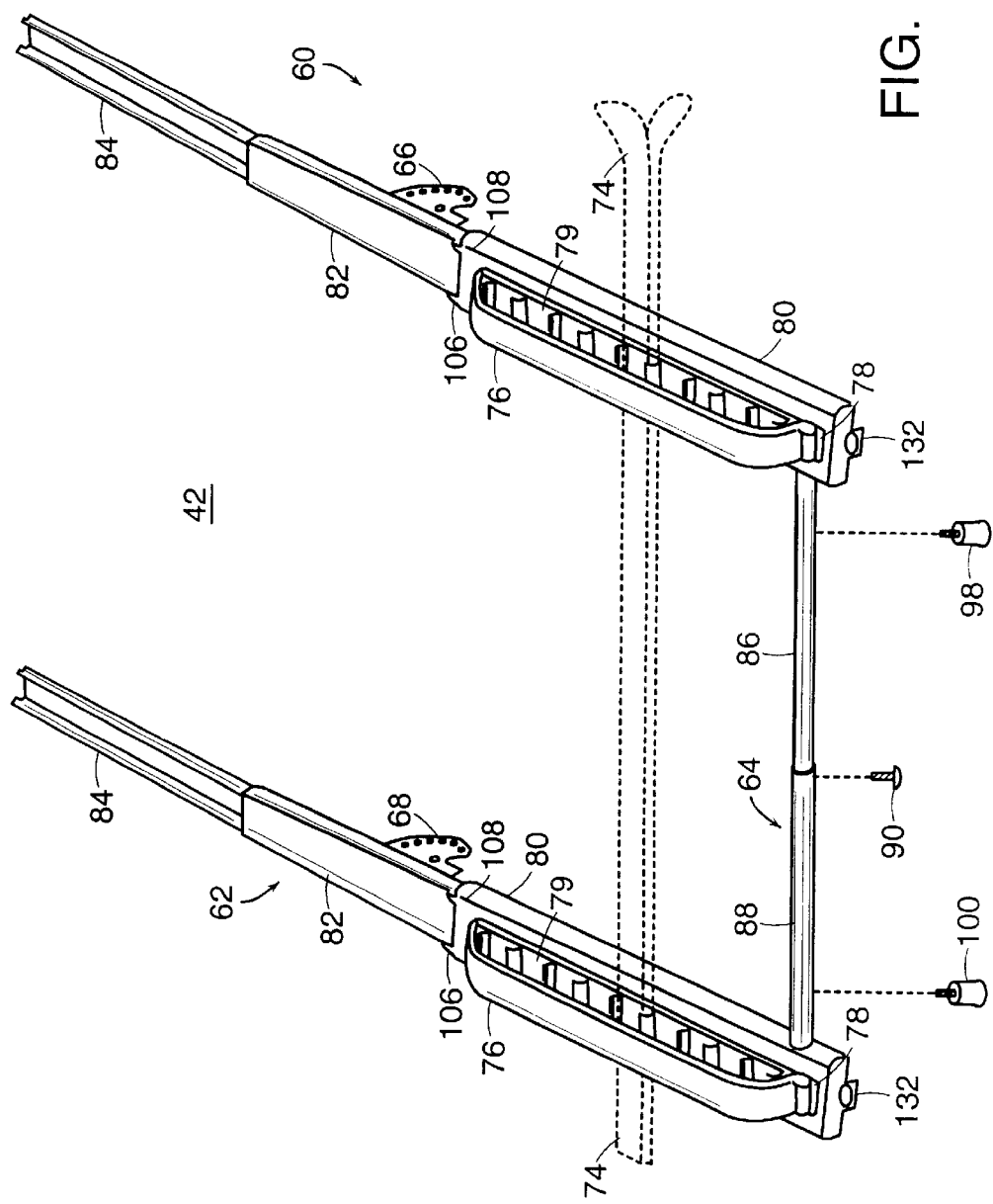
FIG. 7 is a perspective view of the carriage assembly of the present invention showing a typical payload carrier and equipment payload.

This parallel configuration is maintained by an adjustable spacer 64 as shown particulary in FIGS. 5–7. The adjustable spacer 64 is of tubular steel or aluminum construction in the preferred embodiment, and includes telescoping members 86 and 88 which provide for adjustment of the horizontal distance between the extension slides 60 and 62. The spacing may be as desired by the user or may be required for matching a particular vehicle roof mount structure. For example, if a vehicle roof surface 16 includes pre-existing and permanently mounted carrier tracks 28 and 30, the adjustable spacer 64 allows the user to adjust the horizontal spacing between the extension slides to match the spacing of the carrier tracks 28 and 30 on the roof surface 16. The adjustable spacer 64 includes locking means in the form of a set screw 90 and threaded holes 92 for temporarily locking the telescoping members 86 and 88 to a desired spacing.

The adjustable spacer 64 also includes two threaded holes 94 and 96 on the underside of spacer 64, preferably located toward its ends. The threaded holes 94 and 96 are for receiving rubber bumpers 98 and 100, which provide support for the carriage assembly 42 in cases where the carriage assembly 42 comes to rest against a side window or side of the vehicle 10. This can occur where the transport rack is designed for vehicles having a greater than average ground to roof height 14. In this situation, the carriage assembly would be designed to pivot to a greater angle from the horizonal, possibly up to 90 from the horizontal as discussed above.

The adjustable spacer 64 also functions as a handle. To move the equipment transport rack 36 from its loading position to its transport position and vice versa, the user grasps the adjustable spacer 64 and applies pushing or pulling force as needed to move the equipment rack 36 into its alternate operational position. The adjustable spacer 64 is therefore manufactured to be sufficiently sturdy and durable to support the forces associated with lifting and moving a particular equipment payload. Also, it is contemplated that the adjustable spacer 64 includes handle padding or friction grip means to provide a definite gripping surface for the user's hands. It is further contemplated that separate handle means be provided for the user, not associated with the adjustable spacer 64, for moving the equipment transport rack 36 from its loading position to its transport position and vice versa.

As shown particularly with reference to FIG. 4, the extension slides 60 and 62 each include a plurality of interlocking, overlapping slide sections or slide rails. As a minimum, there is a base slide rail 84, which is the lowest, innermost slide section, and there is a top slide rail 80, which is the highest, outermost slide section. The extension slides 60 and 62 have a variable overall length controllable by sliding action of the slide rails. Therefore, each extension slide has a minimum or compressed length, as well as a maximum or extended length. The factors which define the compressed or extended length are length of the individual slide rails, the number of slide rails, and the degree of overlap between the slide sections.

In the preferred embodiment, there are three slide rails: a base slide rail 84, an intermediate slide rail 82, and a top slide rail 80. However, it is understood that the intermediate slide rail 82 may not be necessary in alternative embodiments of the present invention. Also, it is contemplated that more than three slide rails may be desirable for certain embodiments of the present invention for particular applications.

The extension slides 44 and 46, are conventional, commercially available extension slides. In the preferred embodiment the extension slide is a Grant #3320 heavy duty full extension drawer slide. The extension slides 44 and 46 have a preferable length of between 18 and 60 inches for each slide rail section, and a preferable width of two to four inches for most configurations of the present invention. The extension slides are of metal construction but it is contemplated that aluminum or light weight, durable plastic could be used to great advantage to reduce the cost of manufacture and the overall weight of the equipment transport rack 36, for transporting light weight equipment payloads. Also, weatherproofing coatings and treatments are applied to the components of the equipment transport rack 36 to presenting rusting and other damage due to variable weather conditions and environments.

Figure 8:
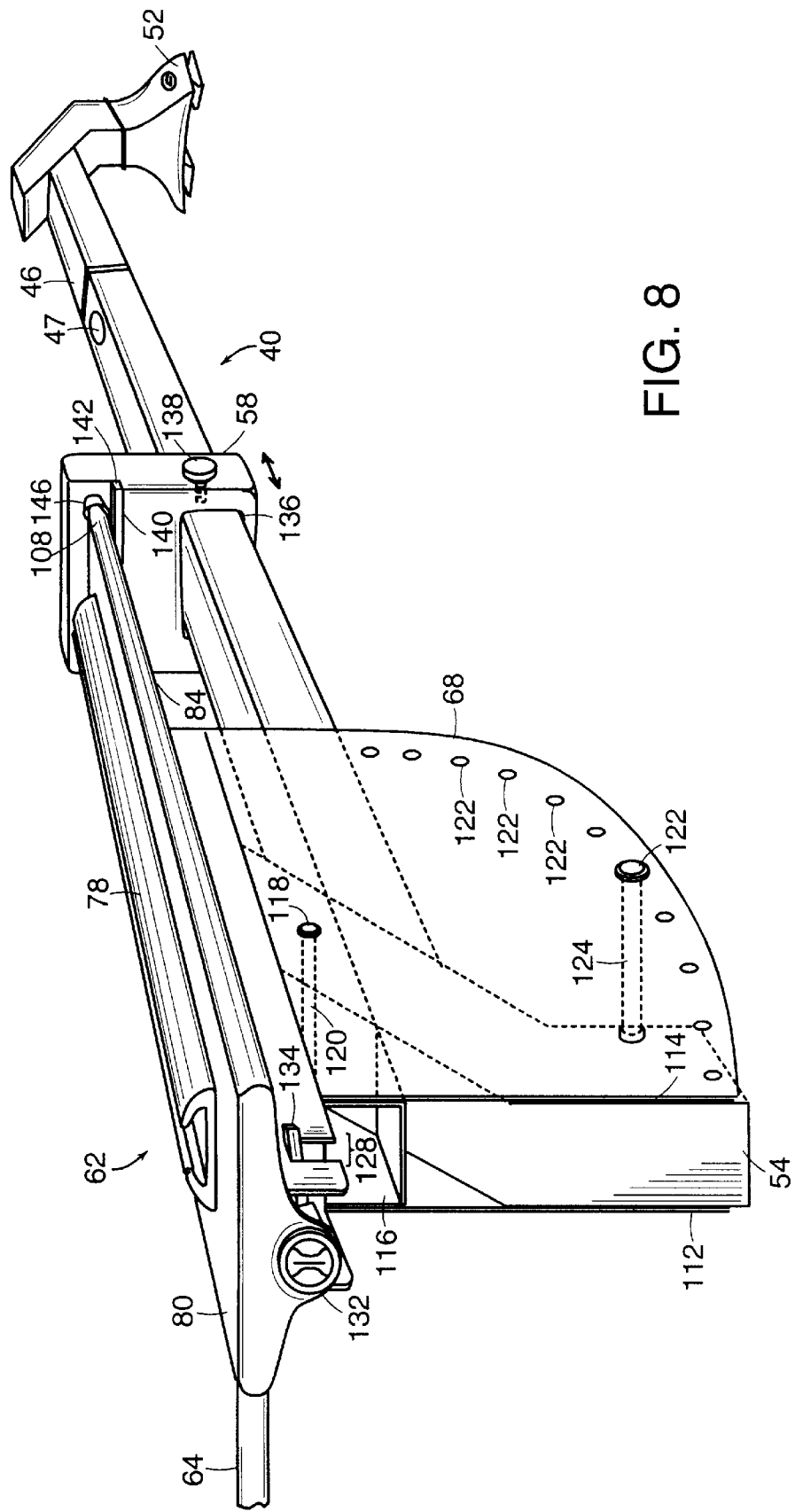
FIG. 8 is a perspective view of one support foot and extension slide in transport position and the pivoting and latching features thereof.

FIG. 4 is a partial perspective view of said plurality of extension slides 60 and 62 showing the interlocking, overlapping function of the individual slide rails. The slide rails are formed of sheet steel and structured so that they can not separate while sliding with respect to each other. The top slide rail 80 holds the intermediate rail 82 and the base slide rail 84 captively as shown. The interlocking slide rails ride on ball bearings 102 and 104 to provide a smooth, low-friction sliding action as the extension slide is moved between from its extended length to its compressed length and vice versa. The base slide rail 84 is pivotally mounted to the support foot means 38 and 40 by pivot brackets 66 and 68 as will be described in detail in connection with FIGS. 8 through 10.

Also shown particularly with reference to FIGS. 5 and 7 are latching projections 106 and 108, which interact with latch means 56 and 58 to prevent the carriage assembly from pivoting when in its retracted or transport position. The function of latching projections 106 and 108 will be described in more detail with reference to FIG. 8 further on.

Referring now to FIG. 7, the a payload carrier 76 is shown mounted on the top slides rails 80 of the carriage assembly 42. The payload carrier 76 inserts into a payload receiver 78, shown in FIGS. 5 and 8. The payload receiver 78 is mounted on each of the top slide rails 80 and includes a linear channel for capturing the payload carrier 76; conventional screw-type clamps hold the payload carrier 76 in the payload receiver 78. The payload carrier 76 is generally dedicated to carrying a particular type of equipment payload, such as skis, surfboard, snowboard, fishing poles, and other items. The payload carrier 76 includes a plurality of payload mounts 79 which provides the function of releasably securing a particular item of equipment. In the preferred embodiment shown in FIG. 7, the payload carrier 76 is a simple clamp-down ski-rack mechanism in the form of clamping members and hinged bars; all these elements together function as a payload mount 79 to hold the equipment payload 74, or the skis. The payload carrier 76 elements, mounted on the payload receiver 78 of the top slide rails 80, function in a unitary manner to support and distribute the weight of the payload 74. It is contemplated that the present invention may be practiced by a carriage assembly 42 having a single extension slide and payload receiver, as well as a carriage assembly 42 having more than the two extension slides 60 and 62 shown in FIG. 7. Also, it should be recognized that a wide variety of payload mounts are available to accommodate the various types of equipment which are most advantageously carried exterior to the vehicle.

In the preferred embodiment of FIG. 7, a dedicated payload carrier 76 is mounted on the top slide rails. Alternatively, it is within the scope of the present invention for the payload carrier 76 to be integral with the equipment rack of the present invention so that the payload mounts would have a direct attachment to the plurality of top slides. Also, various dedicated payload carriers may be interchangeably substituted on the top slides by the user, simply by removing and reinstalling mounting hardware. In yet another embodiment of the present invention, a payload carrier is provided transporting multiple equipment types.

Referring now to FIGS. 8 through 12, the structure of a single support foot means 40 and its interaction with the corresponding elements of an extension slide 44 is shown in more detail. The present invention includes a plurality of these elements, and the interaction for each corresponding pair of elements is identical.

The support foot means 40 includes end brackets 52 and 54 for mounting in a fixed relation to the roof surface. The end brackets may be mounted on the roof by sheet metal screws, as in the preferred embodiment in existing roof carrier tracks 28 and 30. In all cases, the mounting must be sufficiently strong to support the weight of the carriage assembly 42 in its two operational positions.

The base slide rail 84 of each extension slide 62 is mounted for pivoting on its corresponding support foot means 40. Pivoting is provided by a pivot bracket 68 which is permanently attached to and part of the carriage assembly. The mounting of the pivot bracket is on the underside of the base slide rail 84.

Figure 9:
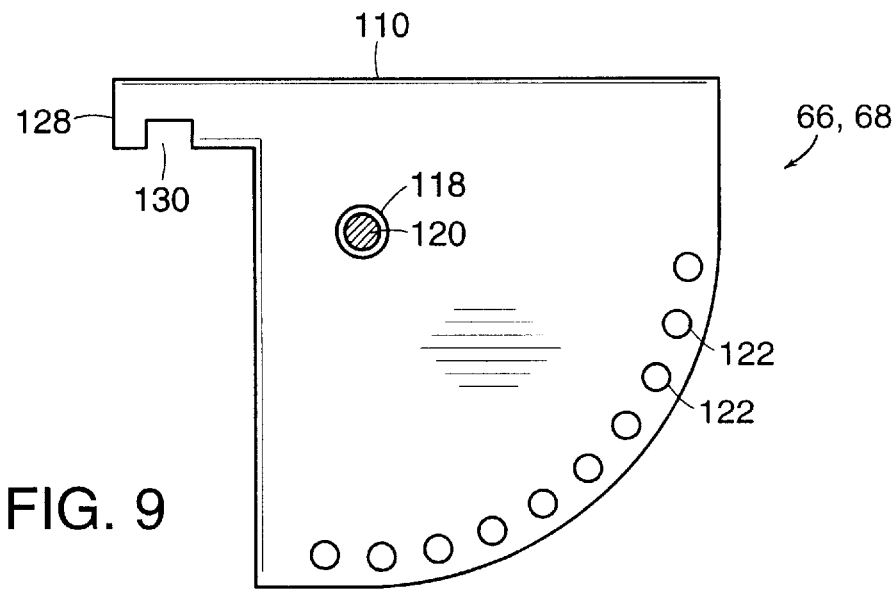
FIG. 9 is a right side plan view of a pivot bracket according to the present invention.
Figure 10:
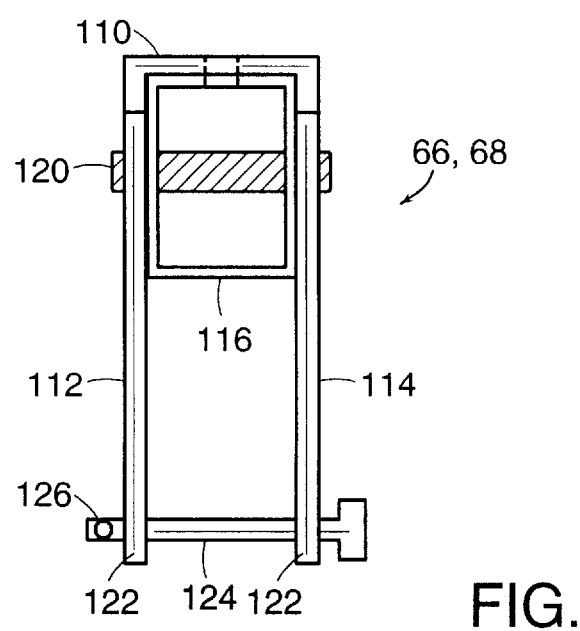
FIG. 10 is a front partial cross-sectional view of the pivot bracket.

The pivot bracket 68 is shown particularly with reference to FIGS. 9 and 10. The pivot bracket includes an upper mounting plate 110, two parallel flanges 112 and 114, a structural reinforcement 116, and aperture 118 for receiving a pivot pin 120, and a plurality of pivot stop apertures 122 for receiving a pivot stop pin 124.

The pivot pin 120 provides an axis of rotation about which the base slide rail 84 may rotate with respect to the support foot means 40. The pivoting motion of the free end of each base slide 62 is upwardly and outwardly toward the roof edge 20, and the range of pivoting motion is from a position approximately horizontal to the plane of the roof surface 16 in the transport position, to an angle in the approximate range of 30 degrees to 90 degrees from the horizontal in the loading position, as previously stated. The maximum possible angle depends on the range of the pivot bracket 68. Other limiting factors may be the mounting location of the support foot means 40 and other factors such as vehicle design.

The pivot bracket 68 is the main load bearing member when the carriage assembly 42 shifts from the transport position to the loading position. Where there are a plurality of pivot brackets 68 in a carriage assembly 42, the load is distributed equally among the brackets 68. Therefore, each pivot bracket 68 and each pivot pin 120 must be constructed of material sufficiently strong to support the maximum load associated with the equipment transport rack 36. It is for this purpose that the pivot bracket 68 includes two parallel flanges 112 and 114 joined by an upper mounting plate 110 and a welded structural reinforcement 116.

The pivot bracket 68 includes one or more pivot stops for limiting the range of pivoting of the extension slide 62 with respect to the support foot 40. The pivot stops include a plurality of pivot stop apertures 122, each defining a maximum range of pivoting motion, and a pivot stop pin 124. With more than one pivot stop, the pivoting range is selectable by moving a stop pin from one pair of apertures 122 to the next. The user can thus adjust the maximum angle that the carriage assembly 42 tilts. When the carriage assembly 42 is in the loading position, the pivot stop pin helps to support the weight of the carriage assembly 42. The pivot stop pin 124 includes an aperture 126 for receiving a retaining clip or cotter pin; alternatively, the pin may include a spring-loaded ball bearing or a simple nut and bolt.

The pivot bracket 68 also includes a flange 128 having a notch 130 therein which cooperates with a locking cylinder 132 and locking pin 134 associated with the top slide rail 80. This locking function will be described in what follows.

A latching means of provided for locking the carriage assembly 42 in the transport position. The purpose of the latching means is to hold the equipment transport rack in place so that it will not become disengaged when subjected to lateral forces which may be encountered when the vehicle 10 makes sharp turning movements. There are two components of motion or degrees of freedom associated with the carriage assembly 42, these being the outwardly extending motion and the downward pivoting motion. Therefore, each possible direction of motion must be counteracted by a latching mechanism. Basically, this means a latching function must be provided at each end of the equipment transport rack 36 when it is in the transport position. The latching must occur near the roof edge 20 but also at the opposite end, toward the roof centerline 22. The present invention provides a structure to latch both ends of each base slide rail 54 with respect to their two degrees of freedom.

To achieve this, each support foot means 40 includes a latch means in the form of a latching block 58 and locking cylinder 132 to hold the corresponding extension slide of the carriage assembly in a stationary secure transport position when the vehicle is in motion. This structure is best shown with reference to FIG. 8. Once engaged, the latch means prevents rotational movement of the pivot means 68 and the linear movement of the extension slides 62 simultaneously, both functions being engaged from the near the roof edge 20.

Figure 11:
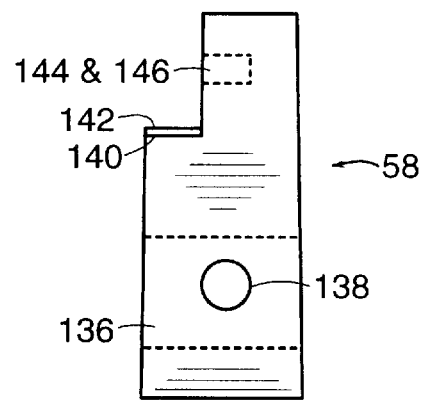
FIG. 11 is a side partial cross-sectional view of a latching block according to the present invention.
Figure 12:
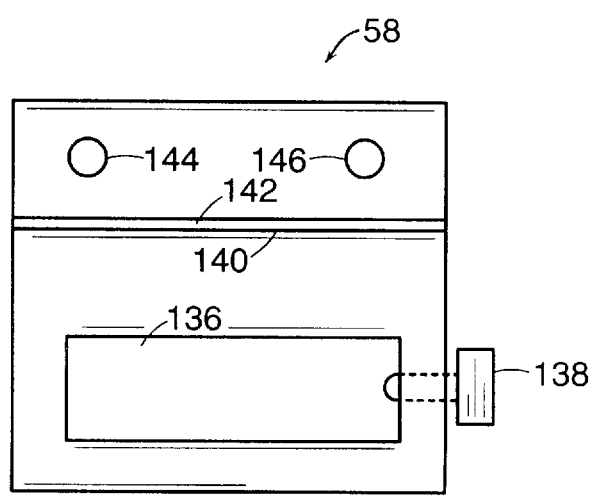
FIG. 12 is a front partial cross-sectional view of the latching block.

The latching block 58 is shown particularly with reference to FIGS. 11 and 12. The latching block mounts slidable on the carrier rail 46 of the support foot 40. It includes a large rectangular aperture 136 which receives the carrier rail 46. In the preferred embodiment, the latching block may be adjusted linearly along the length of the support carrier rail 46 foot and locked in position by a set screw 138. A single latching block 58 may thus accommodate extension slides of differing compressed lengths.

The latching block 58 includes a notch defining a horizontal support shelf 140 for supporting the base slide rail 84 horizontally when the transport rack 36 is in its transport position. The support shelf 140 functions to support the carriage assembly 42 evenly to provide proper alignment of all other functional components as well as to provide an aesthetically pleasing appearance. The support shelf includes a rubber support 142 to cushion the carriage assembly and dampen any rattling sounds while the vehicle 10 is in motion.

The latching block 58 includes apertures 144 and 146 for receiving the latching projections 106 and 108 which are part of the top slide rail 80. When the base slide rail 84 comes to rest on the support shelf 140, the latching projections 106 and 108 are aligned with the apertures 144 and 146. As the top slide rail 80 is slid into the compressed transport position, the latching projections 106 and 108 enter the apertures 144 and 146, and the extension slide 62 is prevented from pivoting.

When the extension slide 62 is compressed with the latching projections 106 and 108 inserted into the apertures 144 and 146 of the corresponding latching block 58, the locking cylinder 132, mounted in the corresponding top slide 80, may be rotated by means of a key to cause an attached locking pin 134 to engage the notch 130 in the pivot bracket 58 to prevent linear movement of the extension slide. Pivoting and linear motion of the extension slide 62 has thus been disabled with the equipment transport rack 36 in the transport position.

Figure 13:
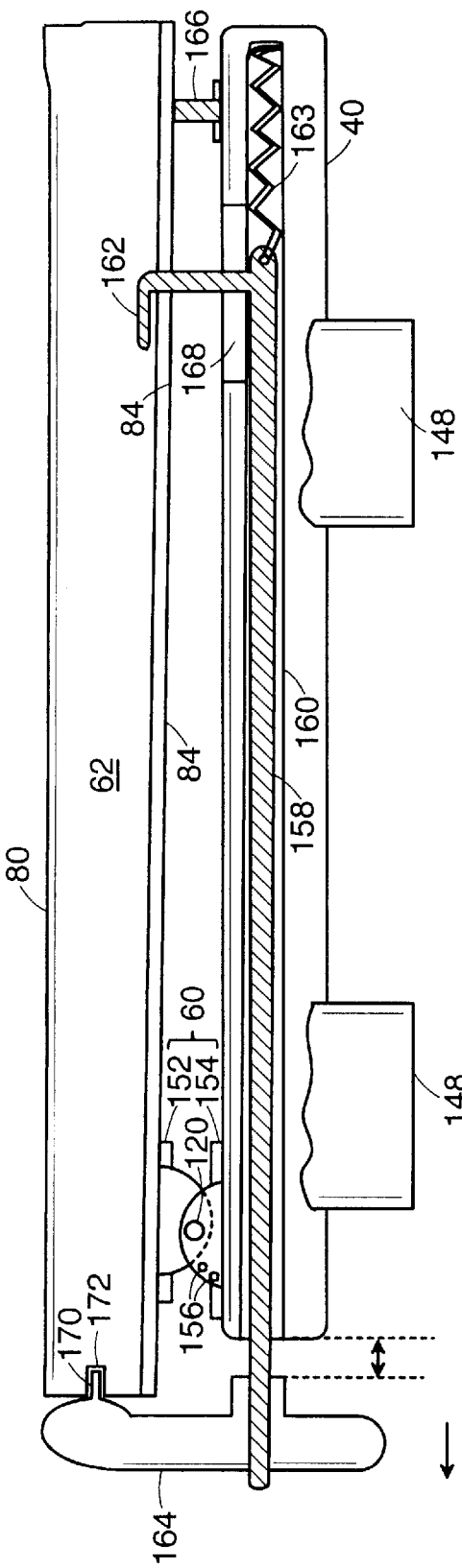
FIG. 13 is a partial cross-sectional lengthwise view of an alternative embodiment of the present invention, showing one support foot and extension slide in transport position showing one support foot and extension slide in transport position and the pivoting and latching features thereof.
Figure 14:
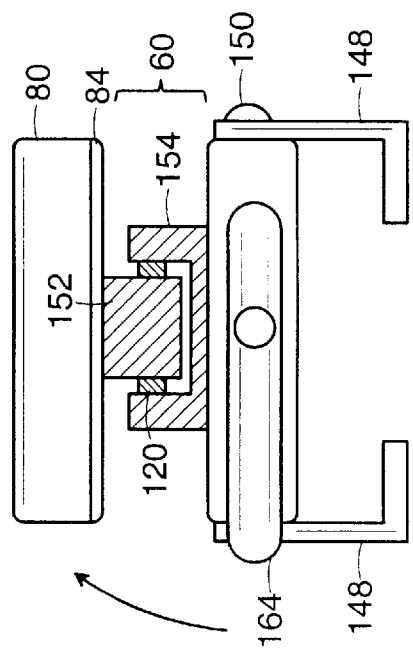
FIG. 14 is a partial cross-sectional front view of the alternative embodiment of the present invention, showing one support foot and extension slide in transport position and the pivoting and latching features thereof.

FIGS. 13 and 14 show an alternative embodiment of the present invention which is particularly useful with vehicles that already include transverse carrier rails 46. The support foot means 40 is an elongated member including clamping means 148 for fixedly mounting the support foot means 40 in a fixed relation to the roof surface 20. In the preferred embodiment, the clamping means is in the form of a pair of L-shaped clamp members 148 opposingly mounted to each side of the support foot means 40 by means of mounting screws 150. The clamp members 148 fit around a carrier rail 46 which is permanently or removably mounted on the roof surface 20. In alternative embodiments, other forms of clamps or mounting brackets may be conveniently provided for direct mounting of the clamping means 148 to the roof surface 20 by means of mounting screws or bolts. In all cases, the mounting must be sufficiently strong to support the weight of the carriage assembly 42 in its two operational positions.

The pivot means 60 includes an upper pivot bracket 152 mounted in the underside of the base slide rail 84, and a lower pivot bracket 154 mounted on the upper side of the support foot means 40. The upper pivot bracket 152 and lower pivot bracket 154 are joined by a pivot pin 120. One of more pivot stops 156 could be located in the upper pivot bracket or lower pivot bracket. Other pivoting structures could be used, including conventional hinges.

The support foot means 40 includes a slidable locking shaft 158 moving in a linear guide channel 160 down the length of the support foot means 40. The locking shaft 158 includes an inverted L-shaped pin 162 integral with or attached to the locking shaft 158. A spring 162 urges or biases the locking shaft 158 inwardly into the guide channel 160. A eccentric T-shaped handle 164 is attached to the locking shaft 158 for rotation. The T-shaped handle 164 may be rotated so that its larger lobe may be positioned upwardly. The T-shaped handle 164 has sufficient dimensions, when rotated upwardly, to engage the top slide rail 80 when the extension slide 62 is fully retracted or compressed. When the carriage assembly 42 is moved into the transport position, a vertical standoff 166, permanently mounted on the support foot means 40, keeps the extension slide 62 in a fixed spacing at an advantageously horizontal angle. In this position, the L-shaped pin 162 fits into an elongated locking slot 168 in the base slide rail 54.

The user latches the carriage assembly 42 in place by pulling the T-shaped handle 164 and rotating up upwardly. When the T-shaped handle 164 is pulled, the L-shaped pin 162 engages the edge of the elongated locking slot 168, preventing pivoting motion. When the handle 164 is rotated upwardly, the larger lobe of the handle 164 engages the compressed extension slide 62 with sufficient spring tension to prevent its outward linear movement. An integral pin 170 in the handle engages and aperture 172 in the top slide rail 80. To disengage the latch, the handle 164 is pulled and rotated a quarter turn.

Referring to FIG. 15, a number of alternative embodiments are shown which are in the spirit and scope of the present invention.

Figure 15A:
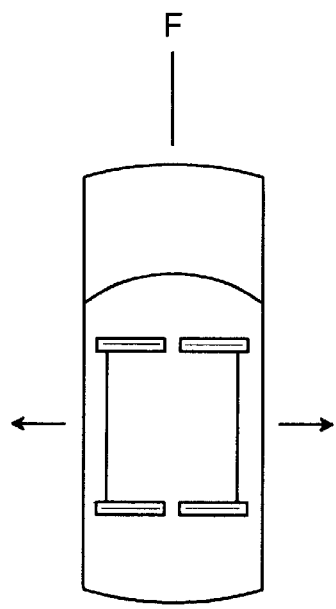
FIGS. 15A, 15B, 15C, 15D, 15E and 15F depict various alternative embodiments and configurations of the equipment transport rack of the present invention.

In FIG. 15A, two half-width equipment transport racks are shown installed on the roof of the vehicle, accessible from each side of the vehicle 10. In this configuration the equipment transport rack of the present invention may be two separate units or a single unit combination unit.

Figure 15B:
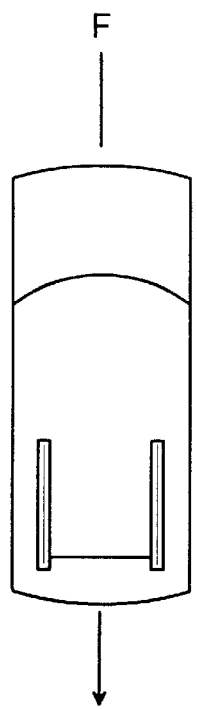

FIG. 15B shows a single equipment transport rack mounted toward the rear of the vehicle so that it can be accessed from the rear of the vehicle.

Figure 15C:
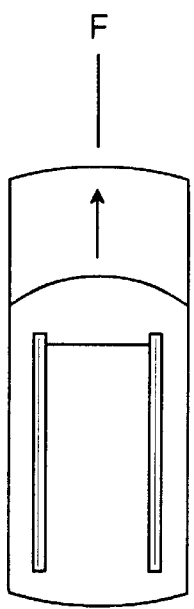

FIG. 15C shows a longer equipment transport rack, accessible from the front of the vehicle, particularly to hold canoes and the like.

Figure 15D:
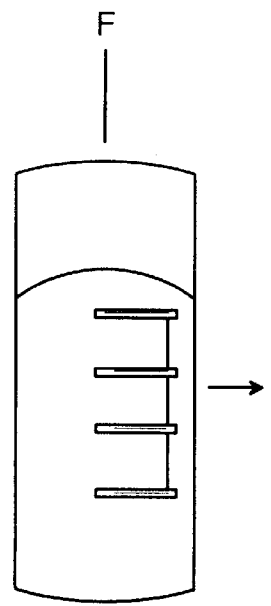

FIG. 15D shows a longer side-loading rack which would accommodate larger cargo such as a kayak or bicycle.

Figure 15E:
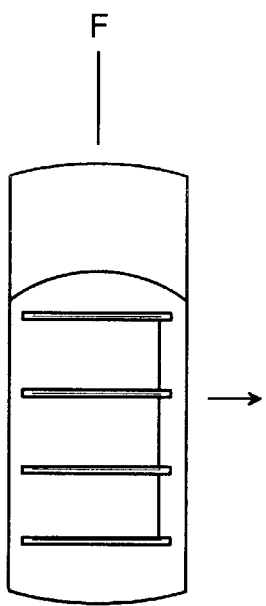

FIG. 15E shows an equipment transport rack spanning the entire roof width for carrying a canoe of small boat. Large items such as canoes need a full width rack, because the heavier weight is most advantageously centered on the roof of the vehicle, and further that the rack must be of a sturdier construction to support the greater weight.

Figure 15F:
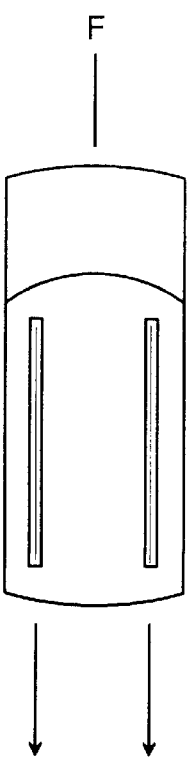

Finally FIG. 15F shows two separate equipment transfer racks, operating independently, each consisting of a carriage assembly with a single extension slide for carrying bicycles of the like. The configuration of FIG. 15F is shown with more particularity in FIG. 16. The carriage assembly 42 includes a single extension slide 62 which is much longer that the one described in the earlier embodiments. The top slide rail 80 includes a payload carrier 78 for carrying bicycles, including a wheel tray 174 and an upright support 176 attached to the frame of a bicycle 178. Because of the extended length of the extension slide 62, a support leg 180 is provided to support the extension slide 62 in its loading position. The support leg is mounted on the side of the top slide 80 and includes a pivot joint 182 to allow it to be pivoted downwardly to contact the ground when the equipment transport rack 36 is in its loading position. It is contemplated that the extension slide 62 or each of the plurality of extension slides 60 and 62 could have an extended length would allow them to rest on the ground.

Figure 16:
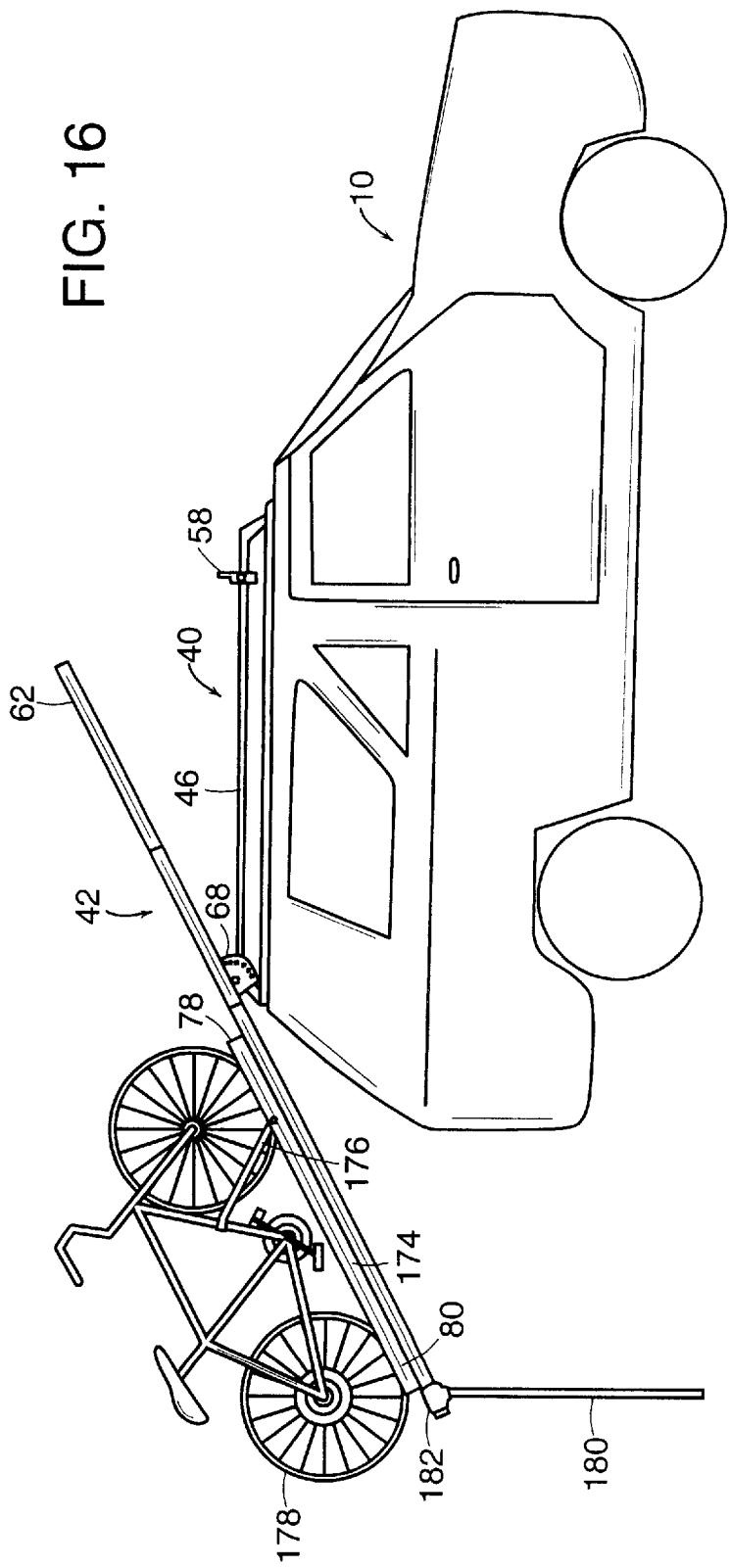
FIG. 16 is a diagrammatic view of further alternative embodiment of the present invention.

All of these various embodiments in FIG. 15 and 16 are within the scope of the present invention and within the scope of the claims.

In view of the above, it will be seen that the several objects of the present invention are readily achieved and other advantageous results attained.

Obviously many modifications and variations of the present invention are possible in light of the above teachings, without departing from the spirit and scope of the invention. The present invention was conceived as a simple device providing low cost manufacture. However, it is contemplated that additional features could be incorporated.

For example, when the equipment rack is made to carry significant weight, this weight may be counterbalanced by spring-based devices which utilize a spring constant, such as coil springs or gas pistons. In this type embodiment, the greater the angle of tilt of the equipment rack, the greater will be the counterbalancing force acting in opposition to the weight on the payload carrier. Therefore, the weight on the payload carrier may be more easily lifted by the user. Similarly, spring devices may be added to the present invention for the purpose of dampening unwanted rapid motion. Also, the operation of the equipment transport rack in its various configurations may be augmented by electric motors and the like control the movement from loading to transport position and vice versa.

Also, although a certain kind of latch is disclosed in the preferred embodiment having the advantages of low cost and easy manufacture, various alternatives are possible, including self-locking latches of different types that are well know to those skilled in the art.

Furthermore, it is contemplated that the pivot means, the latching means, or both the pivot and latching means may be manufactured to be installable on conventional existing carrier rails and secured in fixed position to the vehicle roof by various clamping means.

Finally, although the principles of the present invention are particularly useful for vehicles of various types, it is contemplated that the principles of the present invention are generally adaptable to the loading or unloading of cargo from stationary structures which are used to store equipment or cargo, whenever the storage location in or atop those stationary structures are sufficiently high, in relation to the use's height, to reduce or limit the user's accessibility.

What is claimed is:

1. An equipment transport rack for mounting on the roof of a vehicle, said roof having a roof surface bounded by a roof edge, comprising a support foot means for mounting in a fixed relation to the roof surface proximate the roof edge;

carriage means mounted on the support foot means for pivoting from a horizontal position to a predetermined angled position with respect to the roof surface;

the carriage means including a payload carrier means for temporarily attaching an equipment payload for transport thereon;

the carriage means being linearly extendable from a compressed position to an extended position in which the payload carrier is at least partially beyond the roof edge;

the equipment rack having a loading position for facilitating loading with the carriage means in said predetermined angled and extended positions so that the payload carrier is positioned at least partially below the level of the roof surface;

the equipment rack having a transport position with the carriage means in horizontal and compressed positions so that the payload carrier is positioned above the level of the roof surface; and latching means for removably securing the carriage in the transport position, wherein said latching means includes a latching block adjustably mounted on said support foot means, said latching block having means for engaging the corresponding top slide rail to prevent angular movement of the top slide rail when the equipment transport rack is in its transport position.

2. An equipment rack as recited in claim 1, wherein the support foot means includes a plurality of elongated support foot members in a spaced, parallel configuration.

3. An equipment rack as recited in claim 1, wherein the carriage means includes a plurality of extension slides, each corresponding to and in alignment with one of said support foot members for coacting therewith.

4. An equipment rack as recited in claim 3, wherein each extension slide includes a plurality of interlocking, overlapping slide sections including at least a base slide rail which is the lowest, innermost slide section and a top slide rail, which is the highest, outermost slide section;

each extension slide having a variable length controllable by sliding action of the slide sections, a minimum compressed length, and a maximum extended length, said compressed and extended lengths being predetermined by the length of the individual slide sections, the number of slide sections, and the degree of overlap between the slide sections.

5. An equipment rack as recited in claim 4, wherein said plurality of extension slide sections are oriented and aligned with the corresponding support foot members so that, at the maximum extended length of the extension slides, at least a portion of the top slide rails traverse the roof edge.

6. An equipment transport rack as recited in claim 5, further including adjustable spacing means, mounted between each of said plurality of extension slides for keeping said slides in a parallel relation at a user-chosen separation distance.

7. An equipment transport rack as recited in claim 5, wherein the payload carrier is integral with said top slide rails.

8. An equipment rack as recited in claim 1, further including a pivot means including at least one pivot bracket and pivot pin for mounting the carriage means on the support foot means for pivoting within a predefined range of angular tilt, said range having predefined minimum and maximum tilt.

9. An equipment transport rack as recited in claim 1, wherein the carriage means pivots from said horizontal position to an angle between 30 degrees and 90 degrees from the horizontal.

10. An equipment transport rack as recited in claim 1, wherein said payload carrier includes a dedicated attachment apparatus.

11. An equipment transport rack as recited in claim 1, wherein said payload carrier includes an interchangeable attachment apparatus.

12. An equipment transport rack as recited in claim 1, wherein said payload carrier includes sports equipment attachment means.

13. An equipment transport rack as recited in claim 1, wherein said payload carrier includes bicycle attachment means.

14. An equipment transport rack as recited in claim 1, wherein said payload carrier includes utility equipment attachment means.

15. An equipment transport rack as recited in claim 1, wherein said payload carrier includes recreation equipment attachment means.

16. An equipment transport rack as recited in claim 1, wherein said payload carrier includes boat attachment means.

17. An equipment transport rack as recited in claim 1, wherein said payload carrier includes ladder attachment means.

18. An equipment transport rack as recited in claim 1, further comprising counterbalancing means for counterbalancing the weight of the equipment payload when the transport rack is in its loading position.

19. An equipment transport rack for mounting on the roof of a vehicle, said roof having a roof surface bounded by a roof edge, comprising a support foot means for mounting in a fixed relation to the roof surface proximate the roof edge, the support foot means including a plurality of elongated support foot members in a spaced, parallel configuration;

carriage means mounted on the support foot means for pivoting from a horizontal position to a predetermined angled position with respect to the roof surface, the carriage means including a plurality of extension slides, each corresponding to and in alignment with one of said support foot members for coacting therewith;

each extension slide including a plurality of interlocking, overlapping slide sections including at least a base slide rail which is the lowest, innermost slide section and a top slide rail, which is the highest, outermost slide section;

each extension slide having a variable length controllable by sliding action of the slide sections, a minimum compressed length, and a maximum extended length, said compressed and extended lengths being predetermined by the length of the individual slide sections, the number of slide sections, and the degree of overlap between the slide sections;

the carriage means having a payload carrier with attachment means for temporality attaching an equipment payload for transport thereon;

the carriage means being linearly extendable from a compressed position in which the payload carrier is positioned within the boundary of the roof edge to an extended position in which the payload carrier is at least partially beyond the roof edge;

the equipment rack having a loading position for facilitating loading with the carriage means in said angled and extended positions so that the payload carrier is positioned at least partially beyond the roof edge and at least partially below the level of the roof surface;

the equipment rack having a transport position with the carriage means in horizontal and compressed positions so that the payload carrier is positioned above the level of the roof surface, within the boundary of the roof edge; and latching means for removably securing the carriage in the transport position.

20. An equipment rack as recited in claim 19, wherein the support foot means includes a plurality of elongated support foot members in a spaced, parallel configuration.

21. An equipment rack as recited in claim 20, wherein the carriage means includes a plurality of extension slides, each corresponding to and in alignment with one of said support foot members for coacting therewith.

22. An equipment rack as recited in claim 19, wherein said plurality of extension slide sections are oriented and aligned with the corresponding support foot members so that, at the maximum extended length of the extension slides, at least a portion of the top slide rails traverse the roof edge.

23. An equipment rack as recited in claim 22, wherein said pivot means includes a pivot bracket and pivot pin for joining each support foot member and corresponding base slide rails and for pivoting each extension slide toward the roof edge within a predefined range of angular tilt, said range having predefined minimum and maximum tilt.

24. An equipment transport rack as recited in claim 19, wherein said payload carrier includes a dedicated attachment apparatus.

25. An equipment transport rack as recited in claim 19, wherein said payload carrier includes an interchangeable attachment apparatus.

26. An equipment transport rack as recited in claim 19, wherein said payload carrier includes ski-equipment attachment means.

27. An equipment transport rack as recited in claim 19, wherein said payload carrier includes attachment means for multiple equipment types.

* * * * *